March 31, 1970  L. J. BAUGER ET AL  3,503,696
AXIAL FLOW TURBOMACHINES COMPRISING TWO INTERLEAVED
ROTORS ROTATING IN OPPOSITE DIRECTIONS
Filed Feb. 23, 1968  4 Sheets-Sheet 1
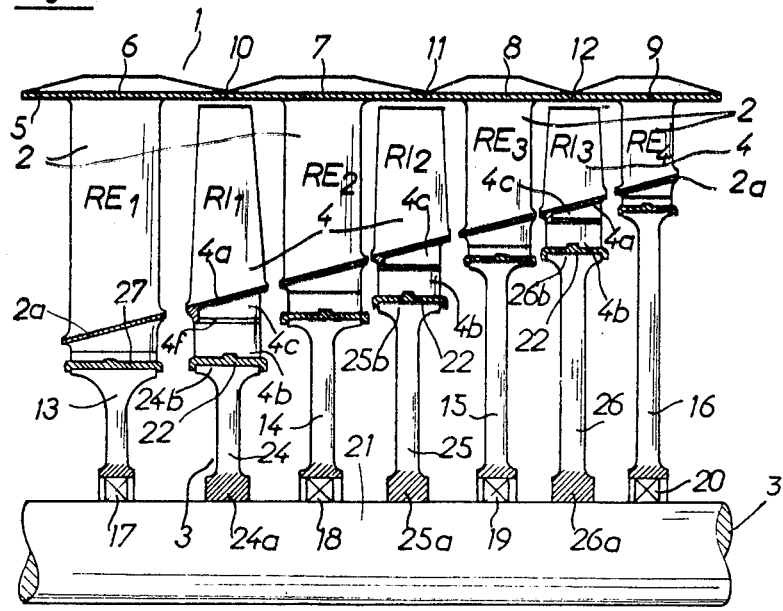
Fig. 1
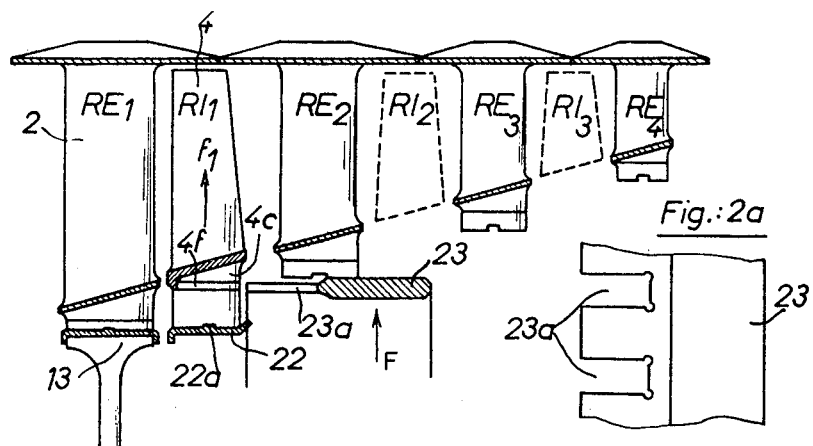
Fig. 2
Fig. 2a
INVENTORS
Louis Jules Bauger
Jean George Bouiller
Michel Robert Garnier
Armand Jean-Baptiste Lacroix
BY Watson, Cole, Grindle + Watson
ATTORNEYS

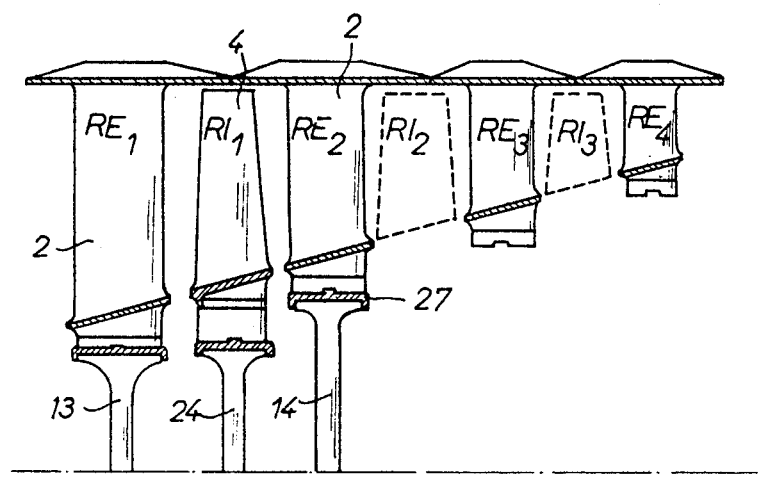
Fig. 7
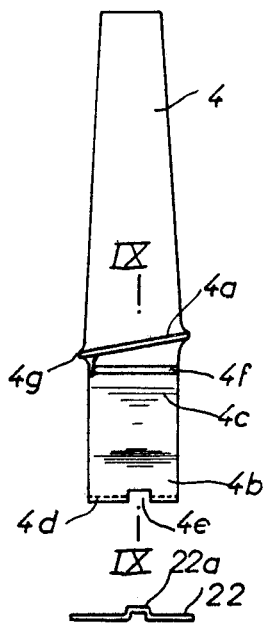
Fig. 8
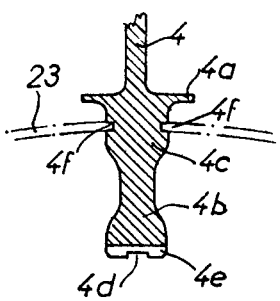
Fig. 9
Fig. 10

United States Patent Office 3,503,696
Patented Mar. 31, 1970

3,503,696
AXIAL FLOW TURBOMACHINES COMPRISING TWO INTERLEAVED ROTORS ROTATING IN OPPOSITE DIRECTIONS
Louis Jules Bauger, Vanves, Jean Georges Bouiller, Brunoy, Michel Robert Garnier, Sceaux, and Armand Jean-Baptiste Lacroix, Itteville, France, assignors to Societe Nationale d'Etude et de Construction de Moteurs d'Aviation, Paris, France, a company of France
Filed Feb. 23, 1968, Ser. No. 707,719
Claims priority, application France, Feb. 27, 1967, 96,687
Int. Cl. F04d 19/00; B21k 3/04; B23a 3/00
U.S. Cl. 416—122                                    4 Claims

ABSTRACT OF THE DISCLOSURE

An axial flow turbomachine comprising two interleaved rotors rotating in opposite directions, of which the outer rotor forms, with the rows of blades carried by it, a unitary prefabricated block while the inner rotor is constituted by a succession of discs to the outer periphery of each of which are removably secured the blades of a row of blades, each of last-mentioned blades carrying a platform radially spaced from said outer periphery and registering with the inner platforms of the blades forming the rows of blades carried by the outer rotor, whereby the platforms on the blades of both rotors lie on a substantially continuous surface bounding inwardly the stream of fluid passing through the machine.

BACKGROUND OF THE INVENTION

Our invention has for its object axial flow turbomachines, chiefly compressors, of the type including two interleaved coaxial rotors adapted to revolve in opposite directions with reference to each other.

It is a well-known fact that one of the major advantages of compressors of such a type consists in that they allow for a given pressure rise a considerable reduction in the number of compressor stages with reference to a machine executed in accordance with the conventional rotor and stator technique. This advantage is ascribable to the fact that it is possible to obtain a relative rotary speed between the two rotors revolving in opposite directions, which is much higher than in the case of a conventional compressor revolving with reference to a stationary stator.

However, the fact that the outer rotor revolves at a speed which may be considerable, of a magnitude for instance of 250 m./second, it constrains the designer to take into account the data relating to the balance and resistance to the stresses arising for high speeds, which data are obviously irrelevant as concerns the design of the stationary stator of a conventional compressor.

It is a well-known fact that it is often of advantage in the case of axial flow machines of a conventional design to form the stator as a single part, so as to cut out the well-known drawbacks of stators made of two parts or half shells rigidly interconnected by means of bolts, for instance, inserted across their diametrical joining plane, said drawbacks being ascribable to the fact that stators are subjected to the action of heat or pressure stresses, which action differs in the different axial planes of the stator, depending on the angular position of said planes with reference to the joining plane between the two half-shells and this may lead to deformations which objectionably affect the maintenance of a gap of an unvariable size.

Still more, in the case of the outer rotors of turbomachines including rotors rotating in opposite directions, it is essential to cut out not only all that may modify the size of the gap, as in the case of conventional machines, but also all that may be detrimental to the mass balance and mechanical resistance of a heavy system having a high average diameter and rotating at a high speed. For this reason, the outer rotors of turbomachines, the rotors of which rotate in opposite directions, are very often constituted by a unitary block constituted by an annular shell which may be smooth or reinforced by ribs and to which are permanently secured several rows of blades forming the outer rotor.

It is, however, a difficult matter to assemble a turbomachine provided with an outer rotor which is not subdivided along an axial plane since such an assembly cannot be executed without resorting to special assembling contrivances. Thus, it has been proposed to subdivide the inner rotor and the outer rotor into a succession of sections formed by discs or rings provided with their blades before their assembly, the whole turbomachine being assembled by alternatingly piling up an inner rotor section and an outer rotor section. Such a modus operandi is, however, impossible in the case of an outer unitary rotor which carries before its assembly and for sake of rigidity, all the annular rows of blades of the outer rotor.

SUMMARY OF THE INVENTION

Our invention has for its object arrangements allowing the assembly of a turbomachine, the outer rotor of which comprises a shell to the inner periphery of which are secured in a permanent manner several annular rows of blades, the system constituted by said shell and said blades forming a prefabricated unitary block.

According to our invention, the other or inner rotor is constituted by a plurality of axially stacked up discs, which are rigid with a common driving shaft and the outer periphery of which carries removable blades provided each, beyond the root member through which it is secured to the corresponding disc, with a platform located at a distance from the periphery of said disc, connected with the root of the blade by an intermediate elongated section and aligned with the corresponding platforms of the adjacent blades incorporated with the outer rotor, so as to bound therewith, inwardly, the stream of fluid flowing through the machine.

It should be remarked from this standpoint that it has already been proposed to resort to blades including an intermediate elongated section for other applications, but this has not been the case for any prior turbomachines including rotors rotating in opposite directions and the outer rotor of which forms with the rows of blades carried by it a single unitary block, with a view to allowing the assembly of the inner rotor of the machine, inside the tunnel-shaped chamber formed by the outer rotor which is provided with all its blades, before the assembly of the inner rotor inside it.

According to our invention, the positioning of the inner rotor is performed in the successive stages by introducing the blades of one stage inside the annular space bounded by two successive rows of blades of the outer rotor, said blades being transiently held in position, for instance, by means of an assembling ring or annulus coaxial with the machine, while the disc corresponding to said stage of the inner rotor is caused thereafter to slide axially and to be fitted on the roots of the blades of said stage thus previously positioned.

The following description, given by way of example and by no means in a binding sense, of a preferred embodiment of our invention illustrated in the accompanying drawing, will allow a proper understanding of said invention, the features of which appear in the drawings, in the specification and in the claims.

BRIEF DESCRIPTION OF THE DRAWINGS

FIG. 1 is a diagrammatic view of a compressor including two rotors rotating in opposite directions, executed in accordance with our invention;

FIGS. 2 to 7 illustrate the various steps of the assembly of the inner rotor of the compressor, FIG. 2a being a partial view, in the direction of the arrow F of FIG. 2, of an annulus which serves for assembling the inner rotor blades and transiently holding them in the position;

FIGS. 8 and 9 illustrate respectively, in elevational and detail sectional views a blade including an intermediate elongated section, as used in accordance with our invention, for the inner rotor; and FIG. 10 is a side elevation view of a locking torque.

DESCRIPTION OF A PREFERRED EMBODIMENT

Figure 3:
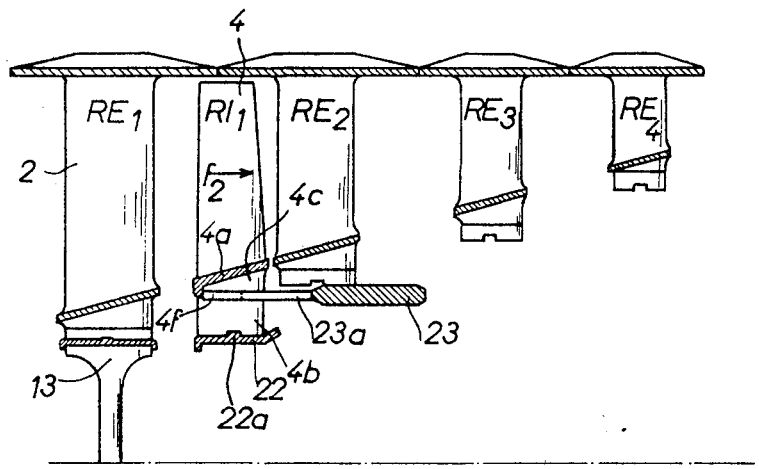

The compressor illustrated diagrammatically in FIG. 1 includes two interleaved coaxial rotors rotating in opposite directions, to wit: an outer rotor 1 carrying blades 2 and an inner rotor 3 carrying blades 4.

With a view to designing the machine in a technically rational manner and to making it operate under mechanically correct conditions, as disclosed hereinabove, while also taking into account economical considerations, it is of advantage to use an outer rotor constituted by an annular shell which is smooth or reinforced by ribs and to which are permanently secured the blades 2 forming the rows RE1, RE2, RE3, RE4, .... The system constituted by the shell and its blades forms thus a prefabricated unitary block.

The blades forming said rows may be secured for instance, by an electronic welding process and they may be provided each with an outer platform 5 the breadth of which in a peripheral direction is defined by the angular spacing of two blades, the juxtaposed platforms of the blades of each row being welded together so as to form a transverse element of the outer shell 6, 7, 8, 9. The successive transverse elements thus obtained are welded together endwise, as shown at 10, 11, 12, so as to form a unitary block incorporating the shell constituted by the thus permanently interconnected transverse elements.

If desired, discs 13 to 16 may be provided as inner extensions of the blade rows RE1, RE2, RE3, RE4, said extensions facing the machine axis so as to revolvably engage, through the agency of bearings 17, 18, 19, 20, a shaft 21 adapted to drive the inner rotor 3. Said arrangement is not essential in so far as the outer shell is capable of directly absorbing all the stresses produced by the centrifugal force exerted on the blades and also in so far as the outer rotor 1 may be revolvably carried by the shaft 21 merely through the agency of external bearings which are not illustrated.

The inner rotor comprises an axial stack of discs 24, 25, 26 ... fitted at 24a, 25a, 26a ... on the shaft 21 and provided along their outer peripheries with axial driftings 24b, 25b, 26b adapted, as described hereinafter, to receive the root members of the blades 4 to be axially inserted therein. The stream of fluid operating in the turbo-machine is bounded, on the one hand, by the inner surface of the shell of the outer rotor and, on the other hand, by the platforms 2a and 4a forming part, respectively, of the outer and inner blades 2 and 4.

FIGS. 8 and 9 show the blades 4 which are to form part of the inner rotor. The inner ends of said blades are each provided with a root member 4b and with a platform 4a which root member and platform are rigidly interconnected by an intermediate elongated section 4c forming said inner end of the blade. The platform 4a has a front edge 4g. Two crossed grooves 4d and 4e are provided in the inner surface terminating each blade root facing the corresponding disc, the depth of the peripheral grooves 4e being larger than that of the grooves 4d extending in parallelism with the axis of the machine. Guiding means such as two grooves 4f parallel with the machine axis are provided across the lateral surfaces of the elongated intermediate section 4c.

Before assembling the inner rotor, a locking tongue 22 (FIG. 10) is fitted with a hard fit in the axially directed groove 4d of the root member 4b of each blade, so that a projecting part 22a of said locking tongue may be housed inside the intersecting area of the two crossed grooves, said projecting part engaging consequently the peripheral groove 4e which is deeper than the other groove, so as to ensure thereby the rigid connection in an axial direction between the blade and the tongue 22.

The assembly of the inner rotor of the turbo-machine is executed as follows: we first insert a transient assembling member 23 which allows introducing radially in succession the blades 4 provided with their tongues 22 inside the annular space extending between the rows RE1, RE2 of the outer rotor (FIG. 2, arrow f1). Said assembling member holds all the blades thus set in a position corresponding to the final position to be occupied by them on the disc. Said assembling member may be, for instance, a ring, an annulus or a sleeve coaxial with the machine and provided with notches 23a distributed with a spacing corresponding to that of the blades, said notches being shown in particular in FIG. 2a. The outer diameter of the annulus 23 is such that it allows its engagement within the inside of the row of blades RE2 of the outer rotor.

Figure 4:
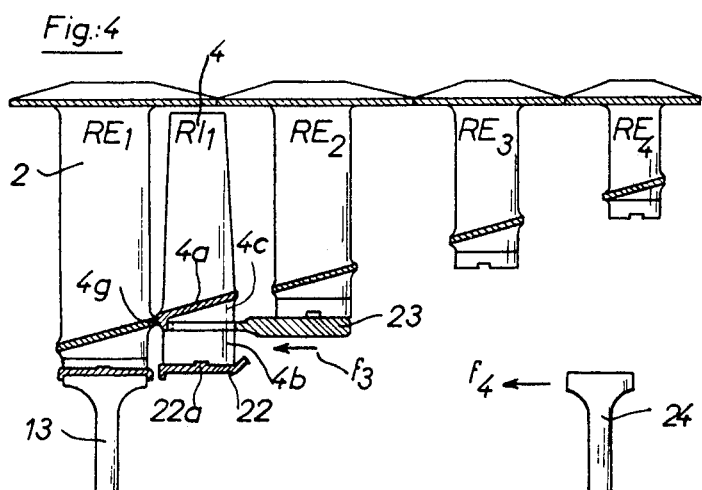

The blades 4 are then caused to slide axially rearwardly with reference to the member 23 over a depth of a few mm., said blades being held by their grooves 4f inside the notches of said assembling member 23. The blades are thus shifted from the position illustrated in FIG. 2 into the position illustrated in FIG. 3, as shown by the arrow f2. The assembling annulus 23 is then urged forwardly in the direction of the arrow f3 (FIG. 4) towards the row of blades RE1 whereby the front edges 4g of the blades 4 are caused to engage the corresponding rear edges of the blades 2 of the outer row of blades RE1. The blades of the inner rotor are perfectly centered through their mating engagement with the notches in the assembling member 23 and they enter a position for which they are adapted to be fitted round the disc 24 forming part of the inner rotor.

To allow such a fitting, it is obviously necessary for the inner diameter of the assembling annulus 23 to be larger than the outer diameter of the disc 24.

Figure 5:
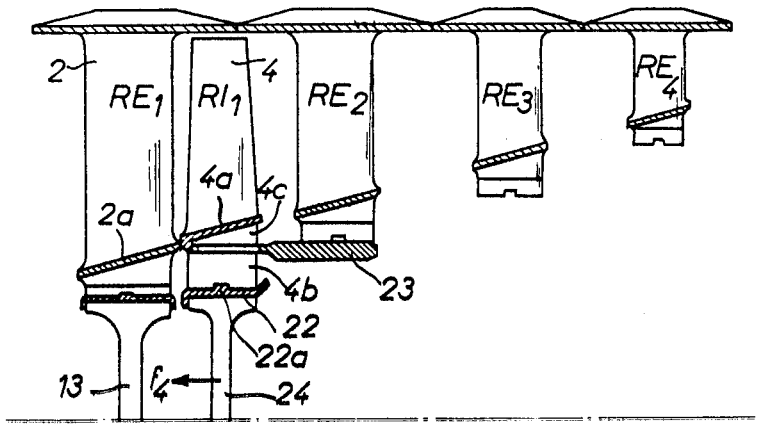
Figure 6:
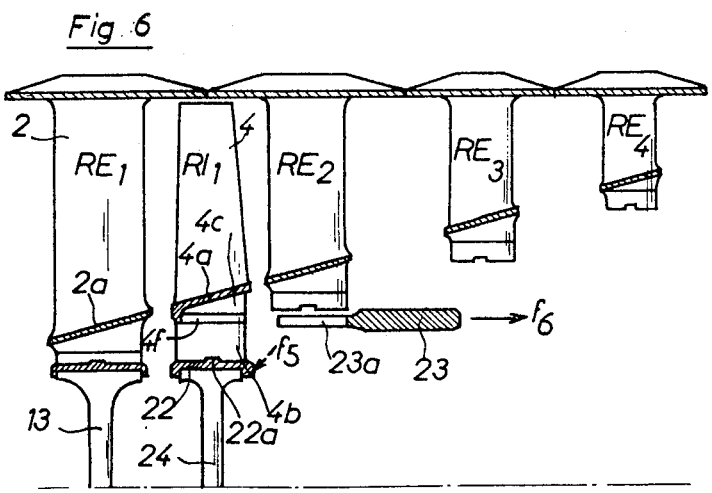

When the blades 4 have been fitted over the disc 24 brought into registry therewith, as shown by the arrow f4 (FIGS. 4 and 5), it is possible to turn down the ends of the locking tongues, as illustrated at f5 in FIG. 6, which ensures the final securing of the blades 4 on the disc 24. The assembling annulus 23 is then removed as shown by the arrow f6 (FIG. 6). The row of blades RE1 forming part of the inner rotor is thus definitely assembled. The disc 14, if any, associated with the outer row of blades RE2 is then inserted, said disc being axially secured to the blades 2 of said row RE2 in a manner similar to that which has been disclosed for the blades of the preceding row of the inner rotor, for instance by means of locking tongues 27 (FIG. 7).

The conditions illustrated in FIG. 1 are then obtained and it is now possible to assemble the following row of blades RI2 in the manner already described. The operation is repeated for each stage by resorting, if required, to a different assembling annulus 23, if the diameters of the discs of the inner rotor and the angular spacing of the blades on said discs is modified from one stage to the other.

It will be remarked that the existence of the clearance provided by the height of the intermediate section 4c of each of the blades 4 allows readily executing the various operations required for the positioning of the inner rotor and in particular the possibility of grasping the blades of said rotor between their root member and platform and also the axial sliding of the discs of the inner rotor which is made possible by their reduced outer diameter.

Obviously, other arrangements may be resorted to, in particular, for the transient supporting of the blades 4 before they are finally fitted on the corresponding disc. Thus, it is possible to replace the annulus 23 and its notches 23a by an assembling ring or sleeve the size of which allows the passage of a disc, said ring or sleeve being provided with suitable clamping means which allow taking hold of the sections 4c forming part of the inner rotor blades.

What we claim is:

1. In an axial flow multistage turbomachine through which a stream of fluid is adapted to pass, the combination of an outer revolvable rotor including shell means and a plurality of rows of blades permanently secured to the inner periphery of said shell means to form therewith a unitary block, each blade being provided with a platform at its free end; a driving shaft; an inner rotor adapted to revolve in a direction opposed to the direction of revolution of the outer rotor and including a plurality of independent axially spaced disc members driven by said shaft and extending radially of the latter in planes extending between successive rows of blades of the outer rotor; further rows of blades for the inner rotor extending between two successive blade rows of the outer rotor; and means removably connecting the further blade rows with the corresponding disc members, said means comprising intermediate elongated sections the ends of which form, respectively, a root member adapted to be secured to the corresponding disc member and a platform rigid with the corresponding blade and lying in alignment with the platforms of the adjacent blades of the outer rotor, the platforms of the blades of both rotors bounding with the shell means the stream of fluid flowing through the turbomachine.

2. A method for assembling an axial flow multistage turbomachine of the type comprising two interleaved coaxial rotors, viz an outer rotor including shell means and a plurality of axially spaced rows of blades permanently secured to the inner periphery of said shell means to form therewith a unitary block, and an inner rotor including a plurality of independent axially spaced disc members to the outer periphery of each of which are removably secured blades pertaining to further rows of blades extending between successive rows of blades of the outer rotor, each of the blades of the inner rotor having an inner end comprising a root member adapted to engage a corresponding disc member, an inner platform radially spaced from said root member, and an intermediate elongated section connecting said root member with said platform, said method comprising the steps of introducing the blades of a row of the inner rotor in succession inside the annular gap separating two successive rows of the outer rotor, transiently holding said blades in position by their respective intermediate elongated sections, causing the corresponding disc member to slide axially into radial registry with said inner rotor blades, and securing last-mentioned blades to said disc member.

3. For use in a method for assembling an axial flow multistage turbomachine of the type comprising two interleaved coaxial rotors, viz., an outer rotor including shell means and a plurality of axially spaced rows of blades permanently secured to the inner periphery of said shell means to form therewith a unitary block, and an inner rotor including a plurality of independent axially spaced disc members to the outer periphery of each of which are removably secured blades pertaining to further rows of blades extending between successive rows of blades of the outer rotor, each of the blades of the inner rotor having an inner end comprising a root member adapted to engage a corresponding disc member, an inner platform radially spaced from said root member, and an intermediate elongated section connecting said root member with said platform, an arrangement for transiently holding the blades of a row of the inner rotor in position in the annular gap separating two successive rows of the outer rotor, said arrangement comprising sleeve means adapted to be shifted inside and coaxially with the outer rotor, said sleeve means being formed adjacent its front edge with a plurality of indentations adapted to engage the respective elongated sections of the blades of said row.

4. For use in a method for assembling an axial flow multistage turbomachine of the type comprising two interleaved coaxial rotors, viz, an outer rotor including shell means and a plurality of axially spaced rows of blades permanently secured to the inner periphery of said shell means to form therewith a unitary block and an inner rotor including a plurality of independent axially spaced disc members to the outer periphery of each of which are removably secured blades pertaining to further rows of blades extending between successive rows of blades of the outer rotor, each of the blades of the inner rotor having an inner end comprising a root member adapted to engage a corresponding disc member, an inner platform radially spaced from said root member, and an intermediate elongated section connecting said root member with said platform, an arrangement for transiently holding the blades of a row of the inner rotor in position in the annular gap separating two successive rows of the outer rotor, said arrangement comprising sleeve means adapted to be shifted inside and coaxially with the outer rotor, and clamping means carried by said sleeve means and adapted to engage the respective intermediate elongated sections of the blades of said row.

References Cited

UNITED STATES PATENTS

| 2,825,124 | 3/1958 | Nichols et al. | 29—156.8 |
| 3,000,081 | 9/1961 | Webb | 29—156.8 |
| 3,186,071 | 6/1965 | Huff | 29—200 |
| 3,246,389 | 4/1966 | Pfau | 29—200 |
| 3,363,831 | 1/1968 | Garnier | 230—123 |
| 3,378,230 | 4/1968 | Toomey. | |
| 2,706,451 | 4/1955 | Mayer-Ortiz et al. | 103—93 |

HENRY F. RADUAZO, Primary Examiner

U.S. Cl. X.R.

29—156.8; 269—287